United States Patent
Kastner et al.

(10) Patent No.: US 9,650,504 B2
(45) Date of Patent: May 16, 2017

(54) HIGH-FLOW FIBER REINFORCED POLYPROPYLENE COMPOSITION

(71) Applicant: Borealis AG, Vienna (AT)

(72) Inventors: Erwin Kastner, Linz (AT); Jochen Kastl, Ottensheim (AT); Markus Hemmeter, Linz (AT)

(73) Assignee: Borealis AG, Vienna (AT)

( * ) Notice: Subject to any disclaimer, the term of this patent is extended or adjusted under 35 U.S.C. 154(b) by 267 days.

(21) Appl. No.: 14/389,543

(22) PCT Filed: Mar. 27, 2013

(86) PCT No.: PCT/EP2013/056578
§ 371 (c)(1),
(2) Date: Sep. 30, 2014

(87) PCT Pub. No.: WO2013/149915
PCT Pub. Date: Oct. 10, 2013

(65) Prior Publication Data
US 2015/0368449 A1   Dec. 24, 2015

(30) Foreign Application Priority Data

Apr. 4, 2012  (EP) ..................... 12163221

(51) Int. Cl.
*C08L 23/00* (2006.01)
*C08L 23/10* (2006.01)
*C08J 9/00* (2006.01)
C08L 23/08 (2006.01)
C08L 23/16 (2006.01)

(52) U.S. Cl.
CPC ............. *C08L 23/10* (2013.01); *C08J 9/0061* (2013.01); *C08L 23/0815* (2013.01); *C08L 23/16* (2013.01); *C08L 2205/02* (2013.01); *C08L 2205/025* (2013.01)

(58) Field of Classification Search
CPC ...... C08L 23/10; C08L 23/0815; C08L 23/16; C08L 2205/02; C08L 2205/025; C08J 9/0061
See application file for complete search history.

(56) References Cited

U.S. PATENT DOCUMENTS

| | | |
|---|---|---|
| 5,234,879 A | 8/1993 | Garoff et al. |
| 5,382,459 A | 1/1995 | Takeuchi et al. |
| 2007/0135547 A1 | 6/2007 | Chundury et al. |
| 2010/0069560 A1 | 3/2010 | Masarati et al. |

FOREIGN PATENT DOCUMENTS

| | | |
|---|---|---|
| CN | 101568589 A | 10/2009 |
| EP | 0 206 034 A1 | 12/1986 |
| EP | 0 260 130 A1 | 3/1988 |
| EP | 0 423 101 A2 | 4/1991 |
| EP | 0 491 566 A2 | 6/1992 |
| EP | 0 537 130 A1 | 4/1993 |
| EP | 0 572 028 A1 | 12/1993 |
| EP | 0 836 608 A1 | 4/1998 |
| EP | 0 887 379 A1 | 12/1998 |
| EP | 1 357 144 B1 | 8/2007 |
| RU | 2154657 C2 | 8/2000 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 97/02276 A1 | 1/1997 |
| WO | 97/28170 A1 | 8/1997 |
| WO | 98/46616 A1 | 10/1998 |
| WO | 98/49208 A1 | 11/1998 |
| WO | 98/56831 A1 | 12/1998 |
| WO | 99/12981 A1 | 3/1999 |
| WO | 99/19335 A1 | 4/1999 |
| WO | 99/24478 A1 | 5/1999 |
| WO | 99/24479 A1 | 5/1999 |
| WO | 99/33843 A1 | 7/1999 |
| WO | 00/34341 A2 | 6/2000 |
| WO | 00/40620 A1 | 7/2000 |
| WO | 00/68315 A1 | 11/2000 |
| WO | 2004/000899 A1 | 12/2003 |
| WO | 2004/111095 A1 | 12/2004 |
| WO | 2008/074715 A1 | 6/2008 |
| WO | 2011/042364 A1 | 4/2011 |

OTHER PUBLICATIONS

Ivanyukov, D.V. et al. Polypropylene (Properties and use). M.: Khimiya, 1974, p. 141-142, 146, 148.
S. Berger and S. Braun, 200 and More NMR Experiments: A Practical Course, 2004, Wiley-VCH, Weinheim.
International Search Report for International Application No. PCT/EP2013/056578, Filed Mar. 27, 2013.
V. Busico and R. Cipullo, Progress in Polymer Science, 2001, 26, 443-533.
B.H. Zimm and W.H. Stockmeyer, J. Chem. Phys. 17, 1301 (1949).

*Primary Examiner* — Nathan M Nutter
(74) *Attorney, Agent, or Firm* — Warn Partners, P.C.

(57) ABSTRACT

Fiber reinforced composition comprising a heterophasic propylene copolymer, a propylene homopolymer and/or a propylene copolymer, and fibers having an average diameter of 12.0 μm or less, wherein the propylene copolymer comprises not more than 2.0 wt.-% C2 to C10 α-olefins other than propylene, the propylene homopolymer and the propylene copolymer have a melt flow rate $MFR_2$ (230° C.) of at least 100 g/10 min, and the composition has a melt flow rate $MFR_2$ (230° C.) of at least 10 g/10 min.

11 Claims, No Drawings

HIGH-FLOW FIBER REINFORCED POLYPROPYLENE COMPOSITION

CROSS REFERENCE TO RELATED APPLICATIONS

This application is a National Stage of International Application No. PCT/EP2013/056578, filed Mar. 27, 2013. This application claims priority to European Patent Application No. 12163221.0 filed on Apr. 4, 2012. The disclosure of the above applications are incorporated herein by reference.

The present invention relates to a fiber reinforced composition as well as articles formed therefrom.

Polypropylene is a material used in a wide variety of technical fields and reinforced polypropylenes have in particular gained relevance in fields previously exclusively relying on non-polymeric materials, in particular metals. One particular example of reinforced polypropylenes are glass fiber reinforced polypropylenes. Such materials enable a tailoring of the properties of the composition by selecting the type of polypropylene, the amount of glass fiber and sometimes by selecting the type of coupling agent used. Accordingly, nowadays the glass-fiber reinforced polypropylene is a well established material for applications requiring high stiffness, heat deflection resistance and resistance to both impact and dynamic fracture loading (examples include automotive components with a load-bearing function in the engine compartment, support parts for polymer body panels, washing machine and dishwasher components). However one drawback of the commercial available fiber reinforced material is its limited flowability and processability. The fact that there is a clear negative correlation between glass fiber content (usually ranging between 10 and 40 wt.-%) and flowability (MFR) makes the forming of thin-wall or otherwise delicate parts difficult or impossible.

There is a need in the art to increase the flowability by varying the polymer material without sacrificing mechanical performance, especially impact strength. Furthermore, there is a need in the art for weight and complexity reduction. The essential requirements are first to have enough flowability to ensure proper filling and making therefore complex parts feasible and second to ensure as low filler content as possible to gain as much as possible lightweight potential. For gaining lighter weight at final application foaming via physical and also chemical foaming becomes more and more important.

Due to legislation requirements in Carbon emission reduction and the need for economical engines it is a special interest in automotive industry to validate all kinds of lightweight potential. Potential fields of interest include substitution of "high-density materials" by replacing with lighter sources or slimming down the relevant part weight. One approach hereby is the use of either chemical or physical foaming. For successful foaming of relevant applications, like instrumental carriers, shrouds, structural carriers, on top to the foaming reactivity it is desired to have good flowabilty of the used plastics in order to match thin walled pre-filling and having low stress levels in the part to allow proper and constant foam building and filling the required wall-thicknesses.

EP 1 357 144 B1 describes the combination of either a propylene homopolymer with an heterophasic propylene copolymer or two different heterophasic propylene copolymers as matrix for glass fiber reinforced material (5-50 wt % fiber content). Polymer component A (a propylene homopolymer or copolymer) has a melt flow rate (MFR) above 10 g/10 min, while polymer component B (a heterophasic copolymer) has a melt flow rate (MFR) of 0.1 to 2.0 g/10 min. The overall melt flow rate (MFR) of the examples is 1.3 to 6.5 g/10 min, with significantly worse mechanics at higher melt flow rates.

EP 0 206 034 A1 describes polyolefin compositions comprising a fibrous inorganic filler (3 to 25 wt.-%). The matrix for the fibrous filler is a combination of a propylene homopolymer or copolymer and a polyethylene having a melt flow rate (MFR) of more than 10 g/10 min with said melt flow rate (MFR) being 0.1 to 50 times the melt flow rate (MFR) of the polypropylene component. The overall flowability in terms of melt flow rate (MFR) of the examples can be estimated from the components to be between 1 and 4 g/10 min.

U.S. Pat. No. 5,382,459 covers glass fiber reinforced polypropylene compositions consisting essentially of a heterophasic copolymer, a carboxylic acid modified polypropylene (as compatibilizer) and glass fiber. The target applications are injection molded wheel caps of high gloss and strength. Neither the overall melt flow rate ($MFR_2$) nor toughness are quantified.

WO 2008/074715 A1 refers to filled polyolefin compositions comprising 15 to 55 wt.-% polypropylene (bimodal mixture with two components having melt flow rates ($MFR_2$) of more than 500 g/10 min and 0.1 to 30 g/10 min, respectively, optionally with 0.5 to 15 wt.-% compatibilizer), 4 to 25 wt.-% elastomeric polymer and 20 to 80 wt.-% of filler. Examples comprising glass fibers (50 wt.-%) have an overall melt flow rate ($MFR_2$) of 3.6 to 7.8 g/10 min with Charpy (IS 179 leU, +23° C.) ranging from 61 to 82 $kJ/m^2$ and tensile modulus from 9700 to 13100 MPa. However the flowability of the compositions is still not satisfying.

Accordingly the object of the present invention is to provide a fiber reinforced composition with excellent flowability and a superior balance of mechanical properties, like flexural modulus, impact strength and elongation at break.

The finding of the present invention is that the fibrous reinforcing material embedded in a polymer composition, which comprises a low viscous polypropylene and a heterophasic polypropylene, is a fiber material having an average diameter of 12.0 µm or less.

Therefore the present invention is directed to a fiber reinforced composition comprising
(a) a heterophasic propylene copolymer (HECO),
(b) a propylene homopolymer (H-PP1) and/or a propylene copolymer (C-PP1), and
(c) fibers (F) having an average diameter of 12.0 µm or less, wherein
  (i) the propylene copolymer (C-PP1) comprises not more than 2.0 wt.-% $C_2$ to $C_{10}$ α-olefins other than propylene,
  (ii) the propylene homopolymer (H-PP1) and the propylene copolymer (C-PP1) have a melt flow rate $MFR_2$ (230° C.) measured according to ISO 1133 of at least 50 g/10 min, and
  (iii) the fiber reinforced composition has a melt flow rate $MFR_2$ (230° C.) measured according to ISO 1133 of at least 10 g/10 min.

In a preferred embodiment, the fibers (F) have an average diameter of 11.5 µm or less, more preferably 11.0 µm or less, still more preferably 10.5 µm or less, such as 8.0 to 12.0 µm, 9.0 to 11.5 µm, or 10.0 to 11.0 µm.

Preferably, the fibers (F) have an aspect ratio of 150 to 450, more preferably 200 to 400, still more preferably 250 to 350. The aspect ratio is the relation between length and diameter of the fibers.

In a further preferred embodiment according to the present invention, the heterophasic propylene copolymer (HECO) of the fiber reinforced composition comprises a polypropylene matrix (M-PP), wherein preferably the polypropylene matrix (M-PP) is a propylene homopolymer (H-PP2), and dispersed therein an elastomeric copolymer (E1) comprising units derived from propylene and ethylene and/or C4 to C20 α-olefin.

The polypropylene matrix (M-PP) of the heterophasic propylene copolymer (HECO) comprised in the fiber reinforced composition according to the present invention has a lower melt flow rate $MFR_2$ (230° C.) measured according to ISO 1133 than the propylene homopolymer (H-PP1) or the propylene copolymer (C-PP1).

In a further preferred embodiment, the fiber reinforced composition according to the present invention comprises (a) 10.0 to 50.0 wt.-%, preferably 20 to 40 wt.-%, more preferably 25 to 35 wt.-% of the heterophasic propylene copolymer (HECO), (b) 20.0 to 70.0 wt.-%, preferably 25 to 65 wt.-%, more preferably 30 to 60 wt.-% of the propylene homopolymer (H-PP1), of the propylene copolymer (C-PP1), or of the mixture of the propylene homopolymer (H-PP1) and the propylene copolymer (C-PP1), and (c) 5.0 to 50.0 wt.-% of fibers (F), preferably 10 to 45 wt.-%, more preferably 15 to 40 wt.-%, still more preferably 15 to 25 wt.-%, such as 20 wt.-%, based on the total weight of the fiber reinforced composition.

Preferably, the heterophasic propylene copolymer (HECO) comprised in the fiber reinforced composition according to the present invention has (a) a xylene cold soluble content (XCS) measured according ISO 6427 (23° C.) of not more than 35 wt.-%, preferably not more than 32 wt.-% such as 25 to 32 wt.-% and/or (b) a melt flow rate $MFR_2$ (230° C.) measured according to ISO 1133 of more than 15 g/10 min, preferably more than 16 g/10 min, such as 16 to 20 g/10 min and/or (c) a total $C_2$ to $C_{10}$ α-olefin content other than propylene of 10 to 30 wt.-%, preferably 15 to 25 wt.-%, more preferably 27 to 31 wt.-%.

In a preferred embodiment, the propylene polymer (H-PP1 or C-PP1) comprised in the fiber reinforced composition according to the present invention is a propylene homopolymer (H-PP1). Further preferably, said propylene homopolymer has a melt flow rate $MFR_2$ (230° C.) measured according to ISO 1133 in the range of 50 to 150 g/10 min, more preferably 55 to 140 g/10 min, still more preferably 60 to 130 g/10 min.

In a further preferred embodiment, the present invention relates to a fiber reinforced composition as defined above, wherein the fibers (F) are selected from the group consisting of glass fibers, metal fibers, ceramic fibers and graphite fibers, and preferably are selected from glass fibers.

It has been surprisingly found out that the fiber reinforced composition possesses very good flowability and foamability while having other properties, like stiffness and impact, on the desired levels. In particular the flexural modulus, the Charpy impact, and the elongation at break fulfill the requirements set for instance by the automobile industry and the appliance industry. The material according to the present invention typically passes the so-called airbag development test, which requires foamability, strength of the material that allows for passing of an airbag through it, and a stiffness that does not lead to brittlement.

The present invention will now be described in more detail. Further preferred embodiments according to the present invention can be taken from the appended claims.

It is apparent from the wording used for the different polymers (HECO, M-PP, H-PP1, C-PP1, and E1)) according to the present invention that they must (chemically) differ from each other. The present invention is further characterized by the fact that none of the polymers HECO (and its individual components) employed is branched. In other words the polymers HECO (and its individual components), H-PP1, C-PP1 and E1 have a branching index g' of at least 0.90, more preferably of at least 0.95, like of 1.00. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith included by reference.

The expression "heterophasic" indicates that the elastomeric copolymer (E1) is preferably (finely) dispersed at least in the polypropylene matrix (M-PP) of the heterophasic propylene copolymer (HECO). In other words the elastomeric copolymer (E1) forms inclusions in the polypropylene matrix (M-PP). Thus the polypropylene matrix (M-PP) contains (finely) dispersed inclusions being not part of the matrix and said inclusions contain the elastomeric copolymer (E1). The term "inclusion" according to this invention shall preferably indicate that the matrix and the inclusion form different phases within the heterophasic propylene copolymer (HECO), said inclusions are for instance visible by high resolution microscopy, like electron microscopy or scanning force microscopy. The final fiber reinforced composition is probably of a complex structure. Probably the polypropylene matrix (M-PP) together with the propylene homopolymer (H-PP1) and/or the propylene copolymer (C-PP1) form a continuous phase being the matrix of the fiber reinforced composition wherein the elastomeric copolymer (E1) forms inclusions dispersed therein.

Additionally the inclusions of the final fiber reinforced composition may also contain the fibers (F); however preferably the fibers (F) are dispersed individually as separate inclusions within the final matrix of the fiber reinforced composition.

Further it is desired that the fiber reinforced composition has a rather high melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the fiber reinforced composition has an $MFR_2$ (230° C.) of at least 10 g/10 min, more preferably of at least 11 g/10 min, such as 11 to 13 g/10 min Thus it is appreciated that the final melt flow rate $MFR_2$ (230° C.) of the fiber reinforced composition is in the range of 10 to 100 g/10 min, preferably of 10.5 to 80 g/10 min, more preferably of 11 to 60 g/10 min.

As stated above the heterophasic propylene copolymer (HECO) preferably comprises
(a) a polypropylene matrix (M-PP) and
(b) an elastomeric copolymer (E1) comprising units derived from
propylene and
ethylene and/or C4 to C20 α-olefin.

Further the heterophasic propylene copolymer (HECO) preferably comprises as polymer components only the polypropylene matrix (M-PP) and the elastomeric copolymer (E1). In other words the heterophasic propylene copolymer (HECO) may contain further additives but no other polymer in an amount exceeding 5 wt-%, more preferably exceeding 3 wt.-%, like exceeding 1 wt.-%, based on the total heterophasic propylene copolymer (HECO), more preferably based on the polymers present in the heterophasic propylene copolymer (HECO). One additional polymer which may be present in such low amounts is a polyethylene which is a reaction product obtained by the preparation of the heterophasic propylene copolymer (HECO). Accordingly it is in particular appreciated that a heterophasic propylene copolymer (HECO) as defined in the instant invention contains only a polypropylene matrix (M-PP), an elastomeric copolymer (E1) and optionally a polyethylene in amounts as mentioned in this paragraph. Further, throughout the present invention the xylene cold insoluble (XCI) fraction of the heterophasic propylene copolymer (HECO) represents the polypropylene matrix (M-PP) and optionally—if present— the polyethylene of the heterophasic propylene copolymer (HECO) whereas the xylene cold soluble (XCS) fraction represents the elastomeric part of the heterophasic polypropylene (H-PP1), i.e. the elastomeric copolymer (E1).

On the other hand the polypropylene matrix (M-PP) content, i.e. the xylene cold insoluble (XCI) content, in the heterophasic propylene copolymer (HECO) is preferably at least 65 wt.-%, more preferably at least 67 wt.-%, yet more preferably at least 69 wt.-%. Thus it is appreciated that the polypropylene matrix (M-PP) content, i.e. the xylene cold insoluble (XCI) content, is preferably in the range of 65 to 75 wt.-%, more preferably in the range of 66 to 72 wt.-%. In case polyethylene is present in the heterophasic propylene copolymer (HECO), the values for the polypropylene matrix (M-PP) content but not for the xylene cold insoluble (XCI) content may be a bit decreased.

As explained above a heterophasic propylene copolymer (HECO) comprises a polypropylene matrix (M-PP) in which the elastomeric copolymer (E1) is dispersed.

As will be explained in detail below the polypropylene matrix (M-PP), the propylene homopolymer (H-PP1), the propylene copolymer (C-PP1) and the elastomeric copolymer (E1) can be unimodal or multimodal, like bimodal in view of the molecular weight distribution and/or the comonomer content distribution.

Thus expression "multimodal" or "bimodal" used herein refers to the modality of the polymer, i.e.
the form of its molecular weight distribution curve, which is the graph of the molecular weight fraction as a function of its molecular weight, and/or
the form of its comonomer content distribution curve, which is the graph of the comonomer content as a function of the molecular weight of the polymer fractions.

As will be explained below, the polypropylene matrix (M-PP), the propylene homopolymer (H-PP1), the propylene copolymer (C-PP1) and the elastomeric copolymer (E1), if they are of multimodal or bimodal character, can be produced by blending different polymer types, i.e. of different molecular weight and/or comonomer content. However in such a case it is preferred that the polymer components of the polypropylene matrix (M-PP), the propylene homopolymer (H-PP1), the propylene copolymer (C-PP1) and/or the elastomeric copolymer (E1) are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

The polypropylene matrix (M-PP) can be a propylene homopolymer (H-PP1) or a propylene copolymer (C-PP1).

However it is preferred that the propylene matrix (M-PP) is a propylene homopolymer (H-PP1).

The expression propylene homopolymer as used throughout the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

Further in case the polypropylene matrix (M-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the polypropylene matrix (M-PP). Accordingly in case of a bimodal system, in particular in view of the comonomer content, the split of the two fractions is roughly 50:50 . Thus in one embodiment the polypropylene matrix (M-PP) comprises two fractions which differ in their comonomer content, like ethylene content, wherein the first fraction is present from 40 to 60 wt.-% and the second fraction from 60 to 40 wt.-%.

The difference of the comonomer content between the two fractions is defined in a way of a preferred embodiment in the following paragraph.

The polypropylene matrix (M-PP) may be produced in a polymerization stage effected in one or more polymerization reactors. Desirably the polypropylene matrix (M-PP) comprising two or more different propylene polymers may be produced by carrying out polymerization in two or more different polymerisation reactors (e.g. bulk and/or gas phase reactors; as bulk reactors, loop reactors are preferred) whereby to generate polymers of the different desired molecular weight distributions or monomer make ups in the different polymerization reactors.

Preferably the polypropylene matrix (M-PP) is isotactic. Accordingly it is appreciated that the polypropylene matrix (M-PP) has a rather high pentad concentration, i.e. higher than 90 mol-%, more preferably higher than 92 mol-%, still more preferably higher than 93 mol-% and yet more preferably higher than 95 mol-%, like higher than 99 mol-%.

Further and preferably the polypropylene matrix (M-PP) has a rather high melt flow rate. Accordingly, it is preferred that in the present invention the polypropylene matrix (M-PP), i.e. the xylene cold insoluble (XCI) fraction of the heterophasic propylene copolymer (HECO), has a melt flow rate $MFR_2$ (230° C.) in a range of 70.0 to 500.0 g/10 min, more preferably of 75.0 to 400.0 g/10 min Additionally it is desired that the polypropylene matrix (M-PP) has not only a rather high melt flow rate $MFR_2$ (230° C.) but also a rather low xylene cold soluble fraction (XCS). Thus it is preferred that the polypropylene matrix (M) fulfils the equation

MFR/XCS>30, preferably MFR/XCS>40, more preferably MFR/XCS>50 wherein

"MFR" is the $MFR_2$ (230° C.) [g/10 min] of the polypropylene matrix (M-PP) measured according to ISO 1133, and "XCS" is the amount of the xylene cold soluble (XCS) fraction [wt.-%] of the polypropylene matrix (M-PP) measured according to ISO 6427(23° C.).

Preferably the xylene cold soluble fraction (XCS) of the polypropylene matrix (M-PP) measured according to ISO 6427(23° C.) is at least 1.0 wt.-%. Even more preferred the polypropylene matrix (M-PP) has a xylene cold soluble fraction (XCS) of not more than 3.5 wt.-%, preferably of not more than 3.0 wt.-%, like not more than 2.6 wt.-%. Thus a preferred range is 1.0 to 3.5 wt.-%, more preferred 1.0 to 3.0 wt.-%, still more preferred 1.2 to 2.6 wt.-%.

Preferably the propylene content in the heterophasic propylene copolymer (HECO) is 75 to 95 wt.-%, more preferably 80 to 94 wt.-%, based on the total heterophasic propylene copolymer (HECO), more preferably based on amount of the polymer components of the heterophasic propylene copolymer (HECO), yet more preferably based on the amount of the polypropylene matrix (M-PP) and the elastomeric copolymer (E1) together. The remaining part constitutes the comonomers, preferably ethylene. Accordingly in a preferred embodiment the comonomer content, i.e. the C2 to C10 α-olefin content other than propylene, is 5 to 25 wt.-%, more preferably 6 to 20 wt.-%.

The second component of the heterophasic propylene copolymer (HECO) is the elastomeric copolymer (E1).

The elastomeric copolymer (E1) comprises, preferably consists of, units derivable from (i) propylene and (ii) ethylene and/or at least another C4 to C20 α-olefin, like C4 to C10 α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E1) may additionally contain units derived from a non-conjugated diene, however it is preferred that the elastomeric copolymer (E1) consists of units derivable from (i) propylene and (ii) ethylene and/or C4 to C20 α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo(2,2,1)hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric copolymer (E1) comprises at least units derivable from propylene and ethylene and may comprise other units derivable from a further α-olefin as defined in the previous paragraph. However it is in particular preferred that elastomeric copolymer (E1) comprises units only derivable from propylene and ethylene and optionally a non-conjugated diene as defined in the previous paragraph, like 1,4-hexadiene. Thus an ethylene propylene non-conjugated diene monomer polymer (EPDM1) and/or an ethylene propylene rubber (EPR1) as elastomeric copolymer (E1) is especially preferred, the latter most preferred.

Like the polypropylene matrix (M-PP) the elastomeric copolymer (E1) can be unimodal or multimodal, like bimodal. Concerning the definition of unimodal and multimodal, like bimodal, it is referred to the definition above.

In the present invention the content of units derivable from propylene in the elastomeric copolymer (E1) equates with the content of propylene detectable in the xylene cold soluble (XCS) fraction. Accordingly the propylene detectable in the xylene cold soluble (XCS) fraction ranges from 50.0 to 75.0 wt.-%, more preferably 55.0 to 70.0 wt.-%. Thus in a specific embodiment the elastomeric copolymer (E1), i.e. the xylene cold soluble (XCS) fraction, comprises from 25.0 to 50.0 wt.-%, more preferably 30.0 to 45.0 wt.-%, units derivable from ethylene. Preferably the elastomeric copolymer (E1) is an ethylene propylene non-conjugated diene monomer polymer (EPDM1) or an ethylene propylene rubber (EPR1), the latter especially preferred, with a propylene and/or ethylene content as defined in this paragraph.

A further preferred requirement of the present invention is that the intrinsic viscosity (IV) of the xylene cold soluble (XCS) fraction of the heterophasic propylene copolymer (HECO) is rather low. Rather high values of intrinsic viscosity improve the ductility of the heterophasic system. Accordingly it is appreciated that the intrinsic viscosity of the xylene cold soluble (XCS) fraction of the heterophasic propylene copolymer (HECO) is below 3.0 dl/g, more preferably below 2.8 dl/g, yet more preferably below 2.5 dl/g. Even more preferred the intrinsic viscosity of the xylene cold soluble (XCS) fraction of the heterophasic propylene copolymer (HECO) is in the range of 1.5 to 3.0 dl/g, more preferably in the range 1.7 to 2.8 dl/g, still more preferably 1.8 to 2.6 dl/g. The intrinsic viscosity is measured according to ISO 1628 in decaline at 135° C.

Additionally it is appreciated that the melt flow rate $MFR_2$ (230° C.) measured according to ISO 1133 of the heterophasic propylene copolymer and/or of the polypropylene matrix (M-PP) is lower than the melt flow rate $MFR_2$ (230° C.) measured according to ISO 1133 of the propylene homopolymer (H-PP1) and of the propylene copolymer (C-PP1).

Accordingly it is in particular appreciated that the ratio of the melt flow rate $MFR_2$ (230° C.) of the heterophasic propylene copolymer (HECO) to the melt flow rate $MFR_2$ (230° C.) of the propylene homopolymer (H-PP1) and the propylene copolymer (C-PP1) [(MFR (HECO)/MFR (H-PP1)) or [(MFR (HECO)/MFR (C-PP1))] is in the range of 1:4 to 1:50, more preferably in the range of 1:6 to 1:40). But not only the melt flow rate $MFR_2$ (230° C.) of the heterophasic system as such shall differ from the melt flow rate $MFR_2$ (230° C.) of the propylene homopolymer (H-PP1) and the propylene copolymer (C-PP1), respectively, but preferably also the melt flow rate $MFR_2$ (230° C.) of the matrix part of the respective heterophasic system shall differ from the melt flow rate $MFR_2$ (230° C.) of the propylene homopolymer (H-PP1) and the propylene copolymer (C-PP1), respectively. The heterophasic propylene copolymer (HECO) is featured by a xylene cold soluble (XCS) fraction and a xylene cold insoluble (XCI) fraction. In the present application the xylene cold insoluble (XCI) fraction of the heterophasic propylene copolymer (HECO) is essentially identical with the matrix of said heterophasic propylene copolymer (HECO).

Accordingly when talking about the melt flow rate of the polypropylene matrix (M-PP) of heterophasic propylene copolymer (HECO) the melt flow rate of the xylene cold insoluble (XCI) fraction of said heterophasic propylene copolymer (HECO) is meant. Accordingly the melt flow rate $MFR_2$ (230° C.) measured according to ISO 1133 of the xylene cold insoluble (XCI) fraction of the heterophasic propylene copolymer (HECO) is lower, preferably at least 50 g/10 min lower, more preferably at least 55 g/10 min lower, yet more preferably at least 60 g/10 min lower, compared to the melt flow rate $MFR_2$ (230° C.) measured according to ISO 1133 of the propylene homopolymer (H-PP1) and of the propylene copolymer (C-PP1), respectively.

The propylene homopolymer (H-PP1) is preferably an isotactic propylene homopolymer. Accordingly it is appreciated that the polypropylene matrix (H-PP1) has a rather high pentad concentration, i.e. higher than 90 mol-%, more preferably higher than 92 mol-%, still more preferably higher than 93 mol-% and yet more preferably higher than 95 mol-%, like higher than 99 mol-%.

Preferably the propylene homopolymer (H-PP1) has a melting temperature Tm measured according to ISO 11357-3 of at least 145° C., more preferably of at least 150° C.

Further the propylene homopolymer (H-PP1) has a rather low xylene cold soluble (XCS) content, i.e. below 4.5 wt.-%, more preferably below 4.0 wt.-%, yet more preferably below 3.7 wt.-%. Thus it is appreciated that the xylene cold soluble (XCS) content is in the range of 0.5 to 4.5 wt.-%, more preferably in the range of 1.0 to 4.0 wt.-%, yet more preferably in the range of 1.5 to 3.7 wt.-%, like 2.0 to 3.5 wt.-%.

The propylene copolymer (C-PP1) preferably comprises, preferably consist of, units derived from
  (i) propylene and
  (ii) ethylene and/or at least one $C_4$ to $C_{20}$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly the propylene copolymer (C-PP1) may comprise units derived from propylene, ethylene and optionally at least another $C_4$ to $C_{10}$ α-olefin. In one specific aspect of the present invention the propylene copolymer (C-PP1) comprises units derived from propylene, ethylene and optionally at least another α-olefin selected from the group consisting of $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the propylene copolymer (C-PP1) comprises units derived from propylene, ethylene and optionally at least another α-olefin selected from the group consisting of 1-butene, 1-pentene, 1-hexene, 1-heptene, 1-octene, 1-nonene and 1-decene, wherein 1-butene and 1-hexene are preferred. It is in particular preferred that the propylene copolymer (C-PP1) consists of units derived from propylene and ethylene. Preferably the units derivable from propylene constitutes the main part of the propylene copolymer (C-PP1), i.e. at least 95.0 wt.-%, preferably of at least 97.0 wt.-%, more preferably of at least 98.0 wt.-%, still more preferably of 95.0 to 99.5 wt.-%, yet more preferably of 97.0 to 99.5 wt.-%, still more preferably of 98.0 to 99.2 wt.-%. The amount of units derived from $C_2$ to $C_{20}$ α-olefins other than propylene in the propylene copolymer (C-PP1), is in the range of 0.5 to 5.0 wt.-%, more preferably 0.5 to 3.0 wt.-%, still more preferably 0.8 to 2.0 wt.-%. It is in particular appreciated that the amount of ethylene in the propylene copolymer (C-PP1), in particular in case the propylene copolymer comprises only units derivable from propylene and ethylene, is in the range of 0.5 to 5.0 wt.-%, preferably of 0.8 to 2.0 wt.-%.

Further it is appreciated that the xylene cold soluble (XCS) content of the propylene copolymer (C-PP1) is a rather low. Accordingly the propylene copolymer (C-PP1) has preferably a xylene cold soluble (XCS) fraction measured according to ISO 6427 (23° C.) of not more than 14.0 wt-%, more preferably of not more than 13.0 wt.-%, yet more preferably of not more than 12.0 wt.-%, like not more than 11.5 wt.-%. Thus a preferred range is 1.0 to 14.0 wt.-%, more preferred 1.0 to 13.0 wt.-%, still more preferred 1.2 to 11.0 wt.-%.

Preferably the propylene copolymer (C-PP1) is isotactic. Accordingly it is appreciated that the propylene copolymer has a rather high pentad concentration, i.e. higher than 95 mol-%, more preferably higher than 97 mol-%, still more preferably higher than 98 mol-%.

Further it is appreciated that the units derived from $C_2$ to $C_{20}$ α-olefins other than propylene within the propylene copolymer (C-PP1) are randomly distributed. The randomness indicates the amount of isolated comonomer units, i.e. those which have no other comonomer units in the neighbourhood, compared to the total amount of comonomers in the polymer chain. In a preferred embodiment, the randomness of the propylene copolymer (C-PP1) is at least 30%, more preferably at least 50%, even more preferably at least 60%, and still more preferably at least 65%.

Additionally it is appreciated that the propylene copolymer (C-PP1) has a melting temperature Tm measured according to ISO 11357-3 of at least 140° C., preferably at least 145° C., more preferably at least 150° C. Accordingly the melting temperature ranges preferably from 140 to 164° C., more preferably ranges from 150 to 160° C.

Especially good results are obtainable in case the fiber reinforced composition comprises additionally an elastomer (E2). In such a case it is appreciated that the elastomer (E2) is (chemically) different to the elastomeric copolymer (E1).

The elastomer (E2) according to this invention is preferably a polyethylene, in particular a linear low density polyethylene (LLDPE). Accordingly the elastomer (E2), i.e. the linear low density polyethylene (LLDPE), has a density measured according to ISO 1183-187 in the range of 820 to 905 kg/m$^3$, more preferably in the range of 840 to 900 kg/m$^3$, yet more preferably in the range of 850 to 890 kg/m$^3$, like in the range of 860 to 885 kg/m$^3$.

Further the elastomer (E2), i.e. the linear low density polyethylene (LLDPE), is featured by a specific melt flow rate, namely by a melt flow rate $MFR_2$ (190° C.) measured according to ISO 1133 in the range of 0.5 to 50.0 g/10 min, more preferably in the range of 1.0 to 35.0 g/10 min.

Preferably the elastomer (E2), i.e. the linear low density polyethylene (LLDPE), is a copolymer containing as a major part units derivable from ethylene. Accordingly it is appreciated that the elastomer (E2), i.e. the linear low density polyethylene (LLDPE), comprises at least 50.0 wt.-% units derivable from ethylene, more preferably at least 55.0 wt.-% of units derived from ethylene. Thus it is appreciated that the elastomer (E2), i.e. the linear low density polyethylene (LLDPE), comprises 50.0 to 70.0 wt.-%, more preferably 55.0 to 65 wt.-%, units derivable from ethylene. The comonomers present in the elastomer (E2), i.e. the linear low density polyethylene (LLDPE), are C4 to C20 α-olefins, like 1-butene, 1-hexene and 1-octene, the latter especially preferred. Accordingly in one specific embodiment the elastomer (E2), i.e. the linear low density polyethylene (LLDPE), is an ethylene-1-octene polymer or an ethylene-1-hexene polymer, with the amounts given in this paragraph.

A further essential component of the present fiber reinforced composition are the fibers (F). Preferably the fibers (F) are selected from the group consisting of glass fibers, metal fibers, ceramic fibers and graphite fibers. Glass fibers are especially preferred. The glass fibers may be either cut glass fibers or long glass fibers, although preference is given to using cut glass fibers, also known as short fibers or chopped strands.

As indicated above, the fibers (F) having an average diameter of 12.0 μm or less.

In a preferred embodiment, the fibers (F) have an average diameter of 11.5 μm or less, more preferably 11.0 μm or less, still more preferably 10.5 μm or less, such as 8.0 to 12.0 μm, 9.0 to 11.5 μm, or 10.0 to 11.0 μm.

In general, the glass fibers can have a length of from 1 to 50 mm. The cut or short glass fibers used in the fiber reinforced composition preferably have a length of from 1.0 to 10.0 mm, more preferably from 1.0 to 7.0 mm, and/or a diameter of from 8 to less than12 μm, more preferably from 9 to 11.5 μm.

The fiber reinforced composition may also comprise a compatibilizer (C).

The compatibilizer (C) preferably comprises a modified (functionalized) polymer and optionally a low molecular weight compound having reactive polar groups. Modified α-olefin polymers, in particular propylene homopolymers and copolymers, like copolymers of ethylene and propylene with each other or with other α-olefins, are most preferred, as they are highly compatible with the polymers of the fiber reinforced composition. Modified polyethylene can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to using a propylene polymer grafted with maleic anhydride as the modified polymer, i.e. the compatibilizer (C).

The modified polymer, i.e. the compatibilizer (C), can be produced in a simple manner by reactive extrusion of the polymer, for example with maleic anhydride in the presence of free radical generators (like organic peroxides), as disclosed for instance in EP 0 572 028.

Preferred amounts of groups deriving from polar compounds in the modified polymer, i.e. the compatibilizer (C), are from 0.5 to 3% by weight.

Preferred values of the melt flow rate $MFR_2$ (230° C.) for the modified polymer, i.e. for the compatibilizer (C), are from 1.0 to 500 g/10 min.

The instant composition may additional contain typical other additives useful for instance in the automobile sector, like carbon black, other pigments, antioxidants, UV stabilizers, nucleating agents, antistatic agents and slip agents, in amounts usual in the art.

All components used for the preparation of the instant fiber reinforced composition are known. Accordingly also their preparation is well known. For instance the heterophasic polypropylene (HECO) according to this invention is preferably produced in a multistage process known in the art, wherein the polypropylene matrix (M-PP) is produced at least in one slurry reactor and subsequently the elastomeric copolymer (E1) is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below, comprising the Ziegler-Natta procatalyst, the external donor and the cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 msec.

The particularly preferred embodiment for the preparation of the heterophasic polypropylene (HECO) of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315 . They are incorporated herein by reference.

A further suitable slurry-gas phase process is the Spheripol® process of Basell.

Preferably the heterophasic polypropylene composition according to this invention are produced by using a special Ziegler-Natta procatalyst in combination with a special external donor, as described below in detail, preferably in the Spheripol® or in the Borstar®-PP process.

One preferred multistage process may therefore comprise the steps of:
  producing a polypropylene matrix in the presence of the chosen catalyst system, as for instance described in detail below, comprising the special Ziegler-Natta procatalyst (i), an external donor (iii) and the cocatalyst (ii) in a first slurry reactor and optionally in a second slurry reactor, both slurry reactors using the same polymerization conditions,
  transferring the slurry reactor product into at least one first gas phase reactor, like one gas phase reactor or a first and a second gas phase reactor connected in series,
  producing an elastomeric copolymer in the presence of the polypropylene matrix and in the presence of the catalyst system in said at least first gas phase reactor,
  recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the heterophasic polypropylene (HECO) is preferably obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)
  wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$ The procatalyst is produced as defined for example in the patent applications WO 87/07620, WO 92/19653, WO 92/19658 and EP 0 491 566 . The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
  adding to said titanized carrier
    (i) a dialkylphthalate of formula (I) with $R^{1'}$ and $R^{2'}$ being independently at least a $C_5$-alkyl, like at least a $C_8$-alkyl,
    or preferably
    (ii) a dialkylphthalate of formula (I) with $R^{1'}$ and $R^{2'}$ being the same and being at least a $C_5$-alkyl, like at least a $C_8$-alkyl,
    or more preferably
    (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
  to form a first product,
  subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620. This crystallized adduct is preferably used as the catalyst carrier and reacted to the procatalyst useful in the present invention as described in WO 92/19658 and WO 92/19653.

As the catalyst residue is removed by extracting, an adduct of the titanized carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2 wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BHC01P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

$CH_2=CH-CHR^3R^4$ wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent. This modification is in particular used for the preparation of the heterophasic polypropylene (H-PP1).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic polypropylenes according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \qquad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is either dicyclopentyl dimethoxy silane $[Si(OCH_3)_2(cyclo-pentyl)_2]$ or diisopropyl dimethoxy silane $[Si(OCH_3)_2(CH(CH_3)_2)_2]$.

The additives as stated above are added afterwards to the heterophasic polypropylenes, which are collected from the final reactor of the series of reactors. Preferably, these additives are mixed into the heterophasic polypropylene (HECO) to or during the extrusion process in a one-step compounding process. Alternatively, a master batch may be formulated, wherein the heterophasic polypropylene (HECO) is first mixed with only some of the additives.

The propylene homopolymer (H-PP1) and the propylene copolymer (C-PP1), respectively, as defined in the instant invention may be prepared by polymerizing, in a slurry reactor, for example a loop reactor, propylene optionally together with at least another $C_2$ to $C_{20}$ α-olefin (comonomers), in the presence of a polymerization catalyst to produce at least a part of the propylene homopolymer (H-PP1) or of the propylene copolymer (C-PP1), respectively. In case only a part of the propylene homopolymer (H-PP1) or of the propylene copolymer (C-PP1) is produced, this part is then subsequently transferred to a gas phase reactor, wherein in the gas phase reactor propylene is reacted in order to produce a further part in the presence of the reaction product of the first step. In the second step other $C_2$ to $C_{20}$ α-olefin(s) (comonomers) can be fed as well if needed. This reaction sequence provides a reactor blend of parts (i) and (ii) constituting the propylene homopolymer (H-PP1) or the propylene copolymer (C-PP1). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the propylene homopolymer (H-PP1) or of the propylene copolymer (C-PP1), with respect to the comonomer, like ethylene, distribution as well as with respect to the molecular weights and $MFR_2$ (230° C.) values during said multistage polymerization procedures. However the propylene homopolymer (H-PP1) and the propylene copolymer (C-PP1), respectively, can be also produced in one reactor, like a loop reactor, a method which is preferred.

Such a process (one reactor or more reactors in sequence) can be carried out using any suitable catalyst for the preparation of the propylene homopolymer (H-PP1) and the propylene copolymer (C-PP1), respectively. Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti-Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process for the propylene homopolymer (H-PP1) or the propylene copolymer (C-PP1), as discussed above, is a loop phase process or a loop-gas phase process, such as developed by Borealis, known as Borstar® technology, described for example in EP 0 887 379 A1 and WO 92/12182.

With respect to the above-mentioned preferred loop (slurry) phase process or preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor (in case of a slurry-gas-phase process), wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the propylene homopolymer (H-PP1) or the propylene copolymer (C-PP1), produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

The elastomer (E2), i.e. the linear low density polyethylene (LLDPE), can be manufactured in a slurry loop reactor using a single site catalyst, e.g. metallocene catalyst. Suitable metallocenes and ways of preparing them are within the knowledge and skills of a person skilled in the field. Reference is made to EP 0 260 130, WO 97/28170, WO 98/46616, WO 98/49208, WO 99/12981, WO 99/19335, EP 0 836 608, WO 98/56831, WO 00/34341, EP 0 423101 and EP 0 537 130 . Especially preferred the elastomer (E2), i.e. the linear low density polyethylene (LLDPE), is made using a hafnium metallocene such as a bis (n-butylcyclopentadienyl)hafnium dichloride or a bis (n-butylcyclopentadienyl) hafnium dibenzyl . Other potential catalysts are described in WO 97/28170 and WO 00/40620

For slurry reactors, the reaction temperature will generally be in the range 60 to 110° C. (e.g. 85 to 110° C.), the reactor pressure will generally be in the range 5 to 80 bar (e.g. 50 to 65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions. Preferably, the polymer is produced in a continuously operating loop reactor where ethylene is polymerised in the presence of a polymerisation catalyst as stated above and a chain transfer agent such as hydrogen. The diluent is typically an inert aliphatic hydrocarbon, preferably isobutane or propane. The elastomer (E2) may contain various standard polymer additives such as antioxidants, UV stabilisers and polymer processing agents.

For mixing the individual components of the instant fiber reinforced composition, a conventional compounding or blending apparatus, e.g. a Banbury mixer, a 2-roll rubber mill, Buss-co-kneader or a twin screw extruder may be used. Preferably, mixing is accomplished in a co-rotating twin screw extruder. The polymer materials recovered from the extruder are usually in the form of pellets. These pellets are then preferably further processed, e.g. by injection molding to generate articles and products of the inventive fiber reinforced composition.

The present invention also relates to automotive articles comprising the fiber reinforced composition as defined above.

Furthermore, the present invention also relates to the use of the fiber reinforced composition as defined above for automotive articles.

In addition, the present invention also relates to a process for the preparation of the fiber reinforced composition according to any one of the preceding claims 1 to 8 comprising the steps of adding (a) the heterophasic propylene copolymer (HECO),
(b) the propylene homopolymer (H-PP1), the propylene copolymer (C-PP1), or the mixture of the propylene homopolymer (H-PP1) and the propylene copolymer (C-PP1), and
(c) the fibers (F)

to an extruder and extruding the same obtaining said fiber reinforced composition.

The fiber reinforced composition according to the invention may be pelletized and compounded using any of the variety of compounding and blending methods well known and commonly used in the resin compounding art.

The composition of the present fiber reinforced composition can be used for the production of molded articles, preferably injection molded articles. Even more preferred is the use for the production of parts of washing machines or dishwashers as well as automotive articles, especially of car interiors and exteriors, like instrumental carriers, shrouds, structural carriers, bumpers, side trims, step assists, body panels, spoilers, dashboards, interior trims and the like.

The current invention also provides articles, like injection molded articles or foamed articles, comprising the inventive fiber reinforced composition. Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising the inventive polypropylene composition.

According to a preferred embodiment, the article is a foamed article comprising the fiber reinforced composition described above.

Examples of such foamed articles for automotive applications are instrumental carriers, shrouds, or structural carriers.

Appropriate preparation methods of foamed articles, either by chemical or physical foaming, are commonly known to the skilled person.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in polypropylene by $^{13}C$ NMR Spectroscopy

The isotacticity is determined by quantitative $^{13}C$ nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g. in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i e mmmm fraction of the pentad distribution.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Density is measured according to ISO 1183-187. Sample preparation is done by compression molding in accordance with ISO 1872-2:2007

Melting temperature Tm is measured according to ISO 11357-3

$MFR_2$ (230° C.) is measured according to ISO 1133 (230° C., 2.16 kg load).

MFR (190° C.) is measured according to ISO 1133 (190° C., 2.16 kg load).

Quantification of comonomer content by FTIR spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 □m and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

Intrinsic viscosity is measured according to DIN ISO 1628/1, October 1999 (in Decalin at 135° C.).

Tensile Modulus; Elongation at break; Yield Stress are measured according to ISO 527-2 (cross head speed=50 mm/min; 23° C.) using injection molded specimens as described in EN ISO 1873-2 (dog bone shape, 4 mm thickness).

Flexural Modulus: The flexural modulus was determined in 3-point-bending according to ISO 178 on injection molded specimens of 80×10×4 mm prepared in accordance with ISO 294-1:1996.

Charpy impact test: The Charpy (notched) impact strength (Charpy NIS/IS) is measured according to ISO 179 2C/DIN 53453 at 23° C. and -20° C., using injection molded bar test specimens of 80×10×4 $mm^3$ prepared in accordance with ISO 294-1:1996.

The xylene cold solubles (XCS, wt.-%): Content of Xylene solubles (XCS) is determined at 23° C. according ISO 6427.

Average Fiber Diameter:

Determined according to ISO 1888:2006(E), Method B, microscope magnification of 1000.

2. Examples

The following inventive example IE1 and comparative examples CE1 and CE2 were prepared.

TABLE 1

Composition of examples and comparative examples

|  |  | IE1 | CE1 | CE2 |
| --- | --- | --- | --- | --- |
| PP-1 | [wt.-%] | 48.5 | — | — |
| HECO | [wt.-%] | 28.0 | — | — |
| Fiber 1 | [wt.-%] | 20.0 | — | — |
| PP-2 | [wt.-%] | — | 50.3 | — |
| PP-3 | [wt.-%] | — | 25.0 | — |
| Fiber 2 | [wt.-%] | — | 20.0 | — |
| PP-4 | [wt.-%] | — | — | 60.0 |
| PP-5 | [wt.-%] | — | — | 16.0 |
| Fiber 3 | [wt.-%] | — | — | 20.0 |

PP-1 is the commercial product HJ120UB of Borealis AG which is a homopolymer having an $MFR_2$ (230° C.) of 75 g/10 min and a density of 905 kg/m³.
HECO is the commercial product EF015AE of Borealis AG having an $MFR_2$ (230° C.) of 18 g/10 min, a total comonomer content ($C_2$) of 20 wt.-%, and a content of cold xylene solubles (XCS) of 29 wt.-%.
Fiber 1 is the commercial product ECS 03 T-480H of Nippon Electric Glass Co., Ltd. having a filament diameter of 10.5 μm and a strand length of 3 mm.
PP-2 is the commercial product HD601CF of Borealis AG which is a homopolymer having an $MFR_2$ (230° C.) of 8 g/10 min.
PP-3 is the commercial product HC101BF of Borealis AG which is a homopolymer having an $MFR_2$ (230° C.) of 3.2 g/10 min.
Fiber 2 is the commercial product NEG ECS 03T-480/R having a filament diameter of 13 μm.
PP-4 is the commercial product HG265FB of Borealis AG which is a homopolymer having an $MFR_2$ (230° C.) of 26 g/10 min.
PP-5 is the commercial product HK060AE of Borealis AG which is a homopolymer having an $MFR_2$ (230° C.) of 125 g/10 min.
Fiber 3 is the commercial product EC13 4.5 MM 968 having a filament diameter of 13 μm.

TABLE 2

Results of inventive Example and comparative examples

|  |  | IE1 | CE1 | CE2 |
| --- | --- | --- | --- | --- |
| $MFR_2$ 230° C. | [g/10 min] | 11.43 | 2.2 | 13 |
| Tens. Modulus | [MPa] | 4963.5 | 4800 | 5000 |
| Tens. Strength | [MPa] | 87.1 | 75 | 70 |
| Tens. Strain at break | [%] | 3.1 | 4 | 2.9 |
| 1eU +23° C. | [kJ/m²] | 53.2 | 45 | 32 |
| 1eA +23° C. | [kJ/m²] | 10.9 | 10.5 | 7 |

The material according to the inventive example combines a high flowability, which is relevant for processing automotive parts, with improved stiffness and impact strength. The inventive material also can be foamed to provide an improved foam structure.

We claim:

1. A fiber reinforced composition comprising,
   (a) a heterophasic propylene copolymer (HECO),
   (b) a propylene homopolymer (H-PP1) and/or a propylene copolymer (C-PP1), and
   (c) fibers (F) having an average diameter of 12.0 μm or less and an aspect ratio of 150 to 450,
   wherein
   (i) the propylene copolymer (C-PP1) comprises not more than 2.0 wt.-% $C_2$ to $C_{10}$ α-olefins other than propylene,
   (ii) the propylene homopolymer (H-PP1) and the propylene copolymer (C-PP1) have a melt flow rate $MFR_2$ (230 ° C.) measured according to ISO 1133 of at least 50 g/10min, and
   (iii) the fiber reinforced composition has a melt flow rate $MFR_2$ (230 ° C.) measured according to ISO 1133 of at least 10 g/10 min.

2. The fiber reinforced composition according to claim 1, wherein the heterophasic propylene copolymer (HECO) comprises a polypropylene matrix (M-PP) and dispersed therein an elastomeric copolymer (E1) comprising units derived from
   propylene and
   ethylene and/or C4 to C20 α-olefin.

3. The fiber reinforced composition according to claim 2, wherein the polypropylene matrix (M-PP) has a lower melt flow rate $MFR_2$ (230 ° C.) measured according to ISO 1133 than the propylene homopolymer (H-PP1) or the propylene copolymer (C-PP1).

4. The fiber reinforced composition according to claim 1, wherein the composition comprises
   (a) 10.0 to 50.0 wt.-% of the heterophasic propylene copolymer (HECO),
   (b) 20.0 to 70.0 wt.-% of the propylene homopolymer (H-PP1), of the propylene copolymer (C-PP1), or of the mixture of the propylene homopolymer (H-PP1) and the propylene copolymer (C-PP1), and
   (c) 5.0 to 50.0 wt.-% of fibers (F), based on the total weight of the fiber reinforced composition.

5. The fiber reinforced composition according to claim 1, wherein the heterophasic propylene copolymer (HECO) has
   (a) a xylene cold soluble content (XCS) measured according ISO 6427 (23 ° C.) of not more than 35 wt.-%, and/or
   (b) a melt flow rate $MFR_2$ (230 ° C.) measured according to ISO 1133 of more than 15 g/10 min, and/or
   (c) a total $C_2$ to $C_{10}$ α-olefin content other than propylene of 10 to 30 wt.-%.

6. The fiber reinforced composition according to claim 1, wherein the propylene homopolymer (H-PP1) has a melt flow rate $MFR_2$ (230 ° C.) measured according to ISO 1133 in the range of 50 to 150 g/10 min.

7. The fiber reinforced composition according to claim 1, wherein the fibers (F) are selected from the group consisting of glass fibers, metal fibers, ceramic fibers and graphite fibers.

8. An automotive article comprising the fiber reinforced composition according to claim 1.

9. A foamed article, comprising the fiber reinforced composition according to claim 1.

10. A process for the preparation of the fiber reinforced composition according to claim 1 comprising, the steps of adding
    (a) the heterophasic propylene copolymer (HECO),
    (b) the propylene homopolymer (H-PP1), the propylene copolymer (C-PP1), or the mixture of the propylene homopolymer (H-PP1) and the propylene copolymer (C-PP1), and
    (c) the fibers (F)
    to an extruder and extruding the same obtaining said fiber reinforced composition.

11. The fiber reinforced composition according to claim 1, wherein the heterophasic propylene copolymer (HECO) comprises a polypropylene matrix (M-PP) that is a propylene homopolymer (H-PP2) and dispersed therein an elastomeric copolymer (E1) comprising units derived from
    propylene and
    ethylene and/or C4 to C20 α-olefin.

* * * * *